United States Patent [19]

Kijima et al.

[11] Patent Number: 4,603,882
[45] Date of Patent: * Aug. 5, 1986

[54] VEHICLE REAR SUSPENSION MECHANISM

[75] Inventors: Takao Kijima; Jiro Maebayashi, both of Hiroshima, Japan

[73] Assignee: Mazda Motor Corporation, Hiroshima, Japan

[*] Notice: The portion of the term of this patent subsequent to Jul. 2, 2002 has been disclaimed.

[21] Appl. No.: 667,688

[22] Filed: Nov. 2, 1984

Related U.S. Application Data

[63] Continuation-in-part of Ser. No. 489,106, Apr. 27, 1983, Pat. No. 4,526,400, and Ser. No. 489,132, Apr. 27, 1983, Pat. No. 4,536,007, and Ser. No. 489,492, Apr. 28, 1983, Pat. No. 4,530,513.

[51] Int. Cl.$^4$ .......................... B60G 3/26; B60G 7/00
[52] U.S. Cl. .................................. 280/701; 180/73.3; 267/20 R; 280/689; 280/690
[58] Field of Search ................... 280/701, 660–671, 280/673–675, 688–690; 267/20 R, 20 A, 57 R, 58; 180/73.3

[56] References Cited

U.S. PATENT DOCUMENTS

| | | | |
|---|---|---|---|
| 2,998,265 | 8/1961 | Kozicki | 280/716 |
| 3,446,513 | 5/1969 | Weiertz et al. | 280/666 |
| 4,143,887 | 3/1979 | Williams et al. | 280/697 |
| 4,341,396 | 7/1982 | Decouzon et al. | 280/666 |
| 4,415,178 | 11/1983 | Hatsushi et al. | 280/664 |
| 4,421,332 | 12/1983 | Kosak et al. | 280/95 R |
| 4,436,175 | 3/1984 | Watanabe et al. | 180/254 |
| 4,440,419 | 4/1984 | Kosak et al. | 280/661 |
| 4,526,400 | 7/1985 | Kijima et al. | 280/701 |
| 4,529,221 | 7/1985 | Kijima et al. | 280/701 |
| 4,529,222 | 7/1985 | Kijima et al. | 280/701 |
| 4,529,223 | 7/1985 | Maebayashi et al. | 280/701 |
| 4,530,513 | 7/1985 | Kijima et al. | 280/701 |

FOREIGN PATENT DOCUMENTS

| | | |
|---|---|---|
| 2158931 | 5/1973 | Fed. Rep. of Germany . |
| 2355954 | 5/1975 | Fed. Rep. of Germany . |
| 52-37649 | 9/1977 | Japan . |
| 1345859 | 2/1974 | United Kingdom . |

Primary Examiner—John J. Love
Assistant Examiner—Mitchell J. Hill
Attorney, Agent, or Firm—Fleit, Jacobson, Cohn & Price

[57] ABSTRACT

A vehicle rear suspension mechanism capable of producing a toe-in displacement under a side force, a brake force, an engine brake force and an engine drive force to obtain a stabilized steering property. The mechanism includes a suspension member connected with a vehicle body, a wheel hub supporting a rear wheel for rotation about a rotating axis, a connecting device for connecting the wheel hub with the suspension member. The connecting device includes a ball joint connecting the wheel hub to the suspension member pivotably about the joint center. The ball joint is located in one of four quadrants defined in a rectangular coordinate system having its origin on the rotatable axis of the rear wheel. The device also includes a first resilient bushing located between the wheel hub and the suspension member in one of the three remaining unoccupied quadrants and a second resilient bushing located between the wheel hub and the suspension member in one of the two remaining unoccupied quadrants. In certain embodiments, the first and second bushings are of unequal relative rigidity. In still other embodiments, each of the first and second bushings include stoppers to restrict either forward or rearward movement of the wheel hub.

23 Claims, 18 Drawing Figures

VEHICLE REAR SUSPENSION MECHANISM

This application is a continuation-in-part of U.S. patent application Ser. No. 489,106 filed, Apr. 27, 1983, now U.S. Pat. No. 4,526,400, issued July 2, 1985; U.S. patent application Ser. No. 489,132, filed Apr. 27, 1983, now U.S. Pat. No. 4,536,007, issued Aug. 20, 1985; and U.S. patent application Ser. No. 489,492, filed Apr. 28, 1983, now U.S. Pat. No. 4,530,513, issued July 23, 1985.

CROSS-REFERENCES TO RELATED APPLICATIONS

The following applications, incorporated by reference herein, are related to the present application:

| U.S. Pat. application Ser. No. | Filing Date |
| --- | --- |
| 489,106 | April 27, 1983 |
| 489,132 | April 27, 1983 |
| 489,492 | April 28, 1983 |
| 489,551 | April 28, 1983 |
| 498,433 | May 26, 1983 |
| 510,813 | July 5, 1983 |
| 513,028 | July 12, 1983 |

BACKGROUND OF THE INVENTION

1. Field of the Invention

The present invention relates to vehicle suspension mechanisms and more particularly to vehicle rear suspension mechanisms. More specifically, the present invention pertains to a vehicle rear suspension mechanism in which a toe-in displacement is produced in an outboard rear wheel under a transversely inwardly directed side force.

2. Description of the Prior Art

In general, vehicle rear wheels are subjected, when the vehicle is running through a curved path, to a side force which is directed toward the center of curvature. In order to obtain a steering stability in an operation through a curved path, various proposals have been made to make use of such side force to produce a toe-in displacement in a rear wheel, particularly, in an outboard rear wheel located outwards from the other wheel with respect to the center of curvature, so that an over steering can effectively be prevented. For example, German patent specification No. 2,158,931 discloses a vehicle rear suspension including a rear suspension arm having one end mounted on a vehicle body member for vertical swinging movements and the other end connected with a wheel hub which in turn carries a rear wheel for rotation about its own axis. The connection between the suspension arm and the wheel hub is such that the wheel hub is connected to the arm by means of a vertically extending pivot pin which is located rearwards of the axis of the wheel and a spring which is disposed forwardly of the wheel axis between the wheel hub and the suspension arm. Thus, when the wheel is subjected to an inwardly directed side force, the spring is deflected and a toe-in displacement is produced in the wheel about the joint pin. German patent specification No. 2,355,954 proposes in this type of rear suspension mechanism to vary the spring force in accordance with the side force.

Japanese patent publication No. 52-37649, which corresponds to German patent application No. P 2200351.6, discloses a vehicle rear suspension including a rear suspension arm having one end swingably connected with a vehicle body member and the other end connected with a rear wheel hub. Between the suspension arm and the wheel hub, there are provided a pair of longitudinally spaced resilient members which can deflect in the transverse direction. The forward resilient member has a coefficient of resiliency which is smaller than that of the rearward resilient member so that a longer deflection is produced under a side force in the forward resilient member than in the rearward resilient member producing a toe-in displacement in the rear wheel. Further, there is described in the Japanese patent publication that a toe-in displacement of the rear wheel is also produced under a braking force by placing the center of displacement transversely outwardly of the central plane of the rear wheel.

It should, however, be noted that the aforementioned structures relate only to sideward deformations of springs or resilient members for producing the toe-in displacements so that the side force cannot effectively be utilized. Further, the structures are not designed to produce a toe-in displacement under a force transmitted through a drive axle such as a driving torque or an engine brake force. Moreover, the cited German patent applications do not deal with the subject matter of producing a toe-in displacement under a wheel braking force.

None of the prior art devices provide a rear-suspension system which can cause the rear tires to toe in even when braking forces are exerted thereon through operation of the brake pedal or by the engine-brake effect. The ability of the rear-suspension system to always cause the tires to toe in ensures proper driving stability during cornering. The toe-in ability of the rear-suspension is also desirable from the viewpoint of the stability of the vehicle during straight travel at a high speed which is particularly required in the case of a sports car.

Actually, roads are not completely flat but inherently have bumps and recesses of various sizes which act on the tires as external disturbances in various directions. Further, winds impinging upon the vehicle body in various directions also act on the tires as external disturbances in various directions, and in particular, side winds act on the tires as lateral forces. If the rear-suspension can maintain its toe-in ability even when these external disturbances are exerted on the tires, an understeer condition of the vehicle is always ensured, whereby the vehicle can always be stabilized. The external disturbances act as the lateral force, braking force or driving force described above irrespective of their origins.

Therefore, the rear-suspension system should toe-in against any one of the lateral force, braking force (due either to operation of the brake pedal or the engine-brake effect), and driving force. The lateral force is typically a thrust load produced during cornering and comprises a force acting on the treading point of the tires from outside to inside. The braking force due to operation of brake pedal comprises a force acting on the treading point of the tires from front to rear while the braking force due to the engine-brake effect comprises a force acting on the wheel center of the tires from front to rear. The driving force comprises a force acting on the wheel center from rear to front.

Thus, there is a need for a rear-suspension system that is capable of toe-in against any one of the lateral force, braking force, and driving force. The present invention is directed toward filling that need.

SUMMARY OF THE INVENTION

It is therefore an object of the present invention to provide a vehicle rear suspension mechanism in which a toe-in displacement can be produced in the rear wheel effectively under a side force acting on the wheel.

Another object of the present invention is to provide a vehicle rear suspension mechanism in which a rear wheel toe-in displacement can be produced not only under a side force but also under other forces applied to the rear wheel.

A further object of the present invention is to provide a vehicle rear suspension mechanism in which a rear wheel toe-in displacement can be produced under differing forces applied to the rear wheel.

According to the present invention, the above and other objects can be accomplished by a vehicle rear suspension mechanism comprising a suspension member connected with a vehicle body, wheel hub means supporting a rear wheel having a wheel center plane for rotation about a rotating axis, and connecting means for connecting the wheel hub means with the suspension member. The connecting means includes a ball joint having a pivot center and connecting the wheel hub to the suspension member pivotably about the pivot center. The ball joint is located in one of four quadrants defined in a rectangular coordinate system having its origin on the rotating axis of the rear wheel. The connecting means also includes first resilient means located between the wheel hub means and the suspension member in one of the three remaining unoccupied quadrants and a second resilient means located between said wheel hub means and the suspension member in one of the two remaining unoccupied quadrants. According to the features of the present invention, any displacement of the wheel hub means is made about the ball joint means so that a toe-in movement of the rear wheel can be produced with a minimum wheel displacement. Further, through the arrangement of the ball joint means and the two resilient means, it becomes possible to produce a toe-in movement in the rear wheel under various forces including a side force and other forces. The suspension member may be any type of member which is mounted on the vehicle body on one hand and connected with the wheel hub means on the other hand.

In order to produce a toe-in displacement under a braking force, the ball joint means and the first and second resilient means should be located so that a plane passing through the pivot center and centers of said first and second resilient means intersects a horizontal plane on ground level transversely outwardly of a center plane which is a vertical plane in the rear wheel passing through a wheel center on a vertical plane passing through the rotating axis of the rear wheel. Preferably, the plane passing through the pivot center and the centers of said first and second resilient means intersects a horizontal plane passing through the wheel center transversely inwardly of the center plane on the vertical plane passing through the rotating axis of the rear wheel. With this arrangement, it becomes possible to produce a toe-in displacement of the rear wheel under the engine brake force and the driving force. Of course other arrangements of the intersecting plane are possible. See, for example, copending U.S. patent applications Ser. Nos. 489,106, filed Apr. 27, 1983; 489,132, filed Apr. 27, 1983; and 489,492, filed Apr. 28, 1983. These three applications, which are incorporated by reference herein, share the same inventors and assignee as the present application.

The first and second resilient means may be in the form of rubber bushings having longitudinal axes. The axis of the rubber bushings may be arranged so that a toe-in displacement is produced in the rear wheel when the wheel hub means is swung rearwardly or forwardly about the pivot point of the ball joint. This arrangement makes it possible to produce a toe-in movement under each of the side force, the braking force, the engine brake force and the wheel drive force.

The above and other objects and features will become apparent from the following descriptions of preferred embodiments taking reference to the accompanying drawings, in which:

BRIEF DESCRIPTION OF THE DRAWINGS

FIG. 1b is vertical sectional view showing the connection between the suspension arm and the wheel hub in the right side rear suspension mechanism corresponding to the mechanism shown in FIG. 1a;

DETAILED DESCRIPTION OF THE PREFERRED EMBODIMENTS

Figure 1A:
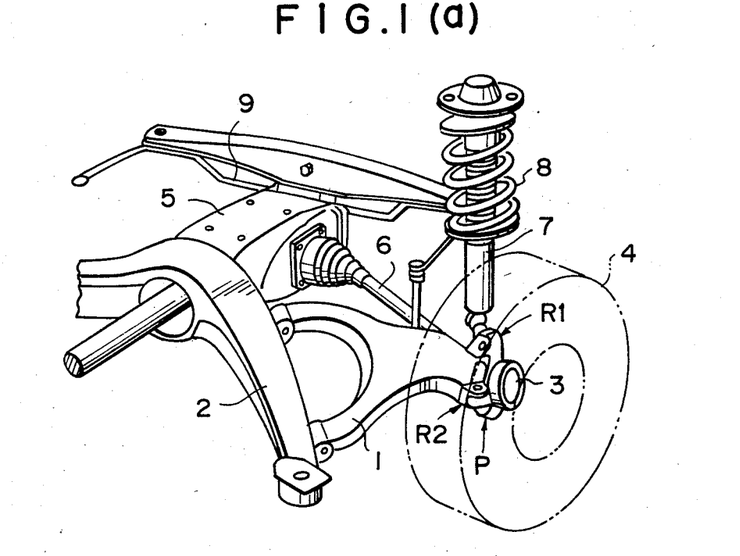
FIG. 1a is a fragmentary perspective view of a left side rear suspension mechanism in accordance with one embodiment of the present invention.

Referring now to the drawings, particularly to FIG. 1a there is shown a vehicle rear suspension mechanism of the semi-trailing arm type including a suspension arm 1 having a bifurcated front end portion connected for vertical swinging movement with a transversely extending sub-frame member 2 of a vehicle body which also carries a differential gear box 5. The rear end portion of the suspension arm 1 carries a wheel hub 3 which in turn carries a rear wheel 4 for rotation about a rotating axis. The rear wheel 4 is connected with a drive axle 6 which extends from the differential gear box 5 so as to be driven by an engine. Between the rear end portion of the suspension arm 1 and the vehicle body, there are provided a shock absorber 7 and a spring 8. A stabilizer 9 may be provided as well known in the art.

Figure 1B:
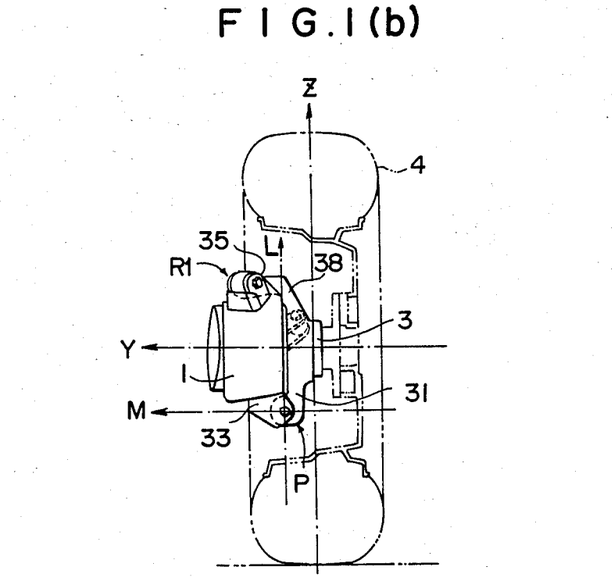
Figure 1C:
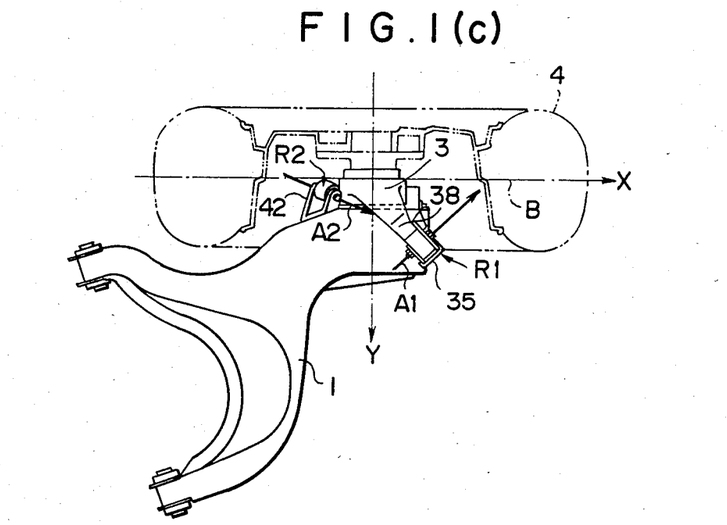
FIG. 1c is a plan view of the mechanism shown in FIG. 1b.
Figure 1D:
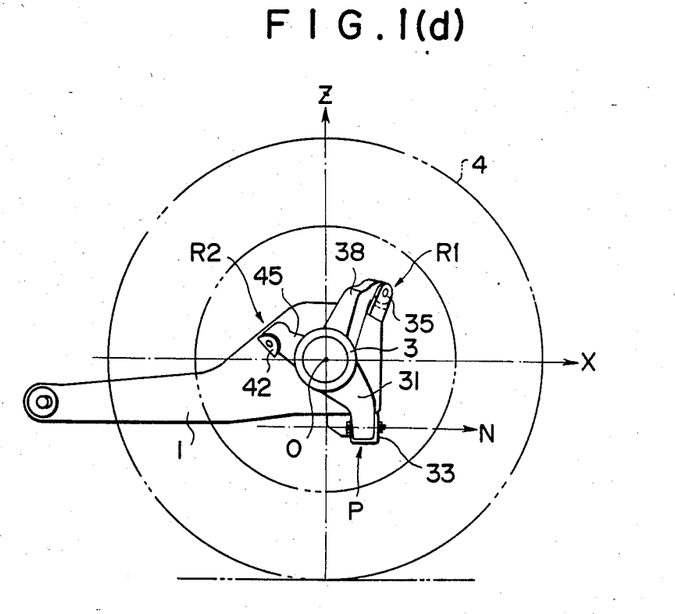
FIG. 1d is a side view as seen from the transverse inside.
Figures 1E, 1F:
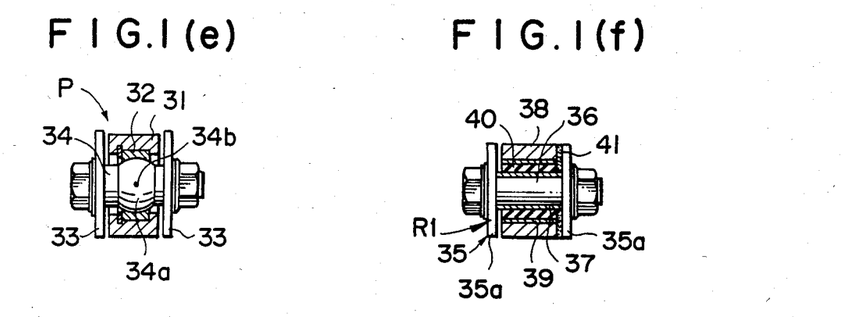
FIG. 1e is a sectional view showing a ball joint used in the mechanism shown in FIGS. 1a through 1d.
FIG. 1f is a sectional view showing a first rubber bushing.

As shown in FIGS. 1b, 1c, and 1d, the wheel hub 3 is connected with the suspension arm 1 through a ball joint P and a pair of rubber bushings $R_1$ and $R_2$. Referring to FIG. 1d, it will be noted that the wheel hub 3 has a radially extending arm 31 which carries at the outer end a bearing metal block 32 having a part spherical recess as shown in FIG. 1e. The rear end portion of the suspension arm 1 is formed with a pair of lugs 33 which are located at the opposite sides of the outer end portion of the arm 31. A pin 34 having a part spherical portion 34a is inserted through the lugs 33 and the outer end portion of the radial arm 31 on the wheel hub 3 with the part spherical portion 34a seated in the part spherical recess in the bearing metal block 32 to constitute the ball joint P. Thus, the wheel hub 3 is swingable with respect to the suspension arm 1 about the center 34b of the part spherical portion 34a.

Referring to FIG. 1f which shows the rubber bushing $R_1$ together with FIG. 1d, the wheel hub 3 has a radially extending arm 38 carrying the rubber bushing $R_1$ which includes an inner tube 37, an outer tube 39 of a length shorter than the inner tube 37 and a resilient rubber 40 disposed between the inner and outer tubes 37 and 39. The suspension arm 1 is formed with a bracket 35 having a pair of lugs 35a. The outer tube 39 is secured to the arm 38 which is located between the lugs 35a and the inner tube 37 is held between the lugs 35a by means of a bolt 36. Between one axial end of the rubber bushing $R_1$ and one of the lugs 35a, there is provided a stopper 41 of a relatively hard rubber so that the arm 38 is displaceable only in one axial direction.

Figure 1G:
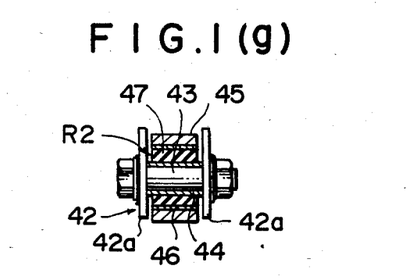
FIG. 1g is a sectional view showing a second rubber bushing.

Referring to FIG. 1g, it will be noted that the rubber bushing $R_2$ is similar in structure and includes inner tube 44, an outer tube 46 and a resilient rubber 47. The outer tube 46 is secured to a radially extending arm 45 formed in the wheel hub 3 and the inner tube 44 is attached by means of a bolt 43 to a pair of lugs 42a formed in a bracket 42 provided on the suspension arm 1. In certain embodiments, the rubber bushing $R_2$ is defined not by the structure just recited, but by the same structure as rubber bushing $R_1$ including stopper 41. In yet other embodiments, the stopper 41 is absent from rubber bushing $R_1$ and there is a relative difference in resilience between the rubber 40 of bushing $r_1$ and the rubber 47 of bushing $R_2$.

In the illustrated embodiment, the ball joint P is located rear and downwardly of the rotating axis O of the wheel 4. In other words, as seen from left side of the right rear wheel, the ball joint is located in the fourth quadrant IV of a rectangular coordinate defined by an abscissa X and an ordinate Z having an origin at the rotating axis O as shown in FIG. 1d. The rubber bushing $R_1$ is in a rear and upward position with respect to the wheel rotating axis O, or in other words, in the first quadrant I in the coordinate mentioned above. Further, the rubber bushing $R_1$ is arranged with the stopper 41 located at the front side of rubber 40 so that the forward displacement of the arm 38 and therefore the forward rotation of the wheel hub 3 are restricted. The rubber bushing $R_2$ is located in a forward and upward portion with respect to the wheel rotating axis O, that is, in the second quadrant II in the aforementioned coordinate system.

As shown in FIG. 1c, the rubber bushing $R_1$ is arranged in a plan view with its longitudinal axis $A_1$ inclined rearwardly and outwardly with respect to a center plane B of the rear wheel 4 and, as described previously, the arm 38 on the wheel hub 3 is displaceable in the direction shown by an arrow but is restricted to be displaced in the opposite direction due to the existence of the stopper 41. The rubber bushing $R_2$ is arranged with its longitudinal axis $A_2$ inclined rearwardly and inwardly with respect to the center plane B of the rear wheel 4 and the arm 45 is displaceable along the axis $A_2$. The above arrangements are diagrammatically shown in FIG. 4.

Figure 4:
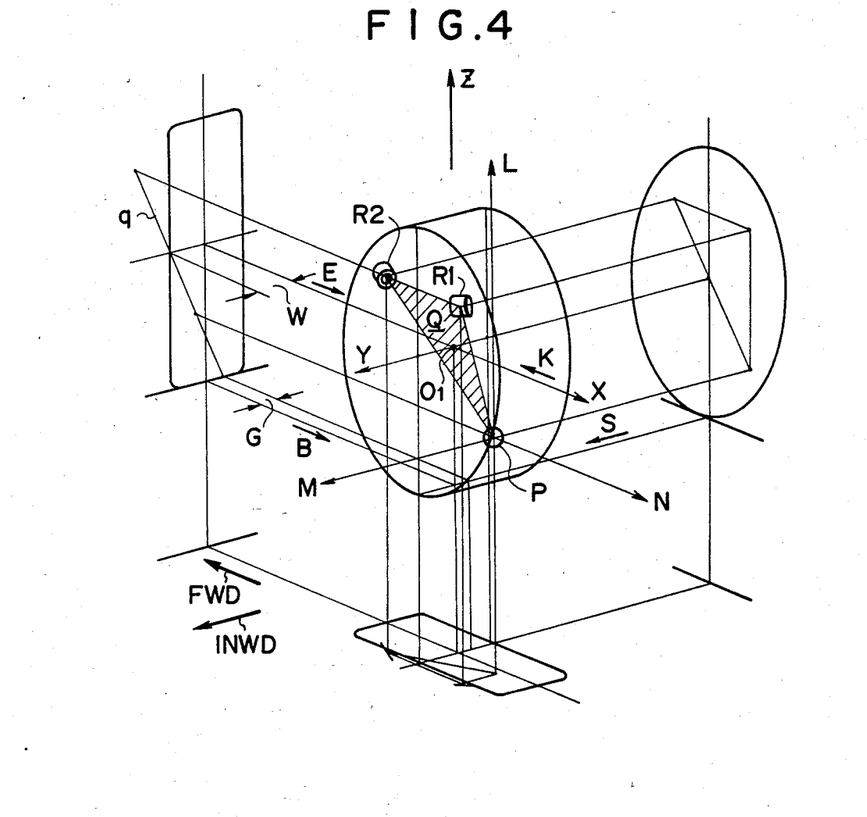
FIG. 4 is a diagrammatical illustrative showing geometical arrangements of the ball joint and the rubber bushes.

In FIG. 4, it will further be noted that a plane Q is defined by the center 34b of the ball joint P and centers of the rubber bushings $R_1$ and $R_2$, the centers of the rubber bushings being defined as the longitudinal centers on the longitudinal axes of the bushings. There is further defined a rectangular coordinate system comprised of a longitudinal horizontal axis X, a vertical axis Z and a transverse horizontal axis Y intersecting with each other at the center $O_1$ of the rear wheel 4. The center $O_1$ of the rear wheel is defined at the intersection between the rotating axis and the center plane. In the illustrated arrangement, the plane Q intersects the YZ plane defining an imaginary line q which is transversely offset inwardly from the wheel center plane by a distance W at the level of the wheel center $O_a$ and outwardly from the wheel center plane by a distance G at the ground level.

With this arrangement, the following displacements are produced in the rear wheel 4. For the purpose of explanation, a second rectangular coordinate system is defined as including a vertical axis L, a transverse horizontal axis M and a longitudinal horizontal axis N having an origin at the center of the ball joint P.

(a) Behavior under a Side Force S

When the vehicle is running through a curved path, a side force S is applied to an outboard rear wheel in the inward direction at ground level. This side force S produces about the longitudinal axis N a moment which tends to incline the wheel outwardly and, since the ball joint P is rearwardly offset from the wheel center $O_1$, a further moment is produced about the vertical axis L to make the rubber bushing $R_2$ deflect transversely inwardly. Thus, a toe-in displacement is produced in the rear wheel. The rubber bushing $R_1$ is appropriately deflected in this instance depending on the location thereof.

(b) Behavior under a Braking Force B

The braking force B is applied rearwardly to the rear wheel 4 at ground level. Since the plane Q is offset at ground level transversely outwardly by the distance G, the rear wheel 4 is swung about the axis L under the braking force B so that the front portion of the wheel 4 is moved laterally inwardly. Thus, a toe-in displacement is produced in the rear wheel 4. At this instance, there is also produced about the transverse axis M a moment which causes the plane Q to rotate forwardly about the ball joint P. Due to the inclination of the axes $A_1$ and $A_2$ of the rubber bushings $R_1$ and $R_2$, the moment tends to deflect the rubber bushing $R_1$ laterally inwardly and the rubber bushing $R_2$ laterally outwardly possibly causing a toe-out movement. However, since the rubber bushing $R_1$ has the aforementioned stopper 41, such lateral inward deflection is prevented and the toe-out preference can be overcome by the aforementioned toe-in trend.

(c) Behavior under an Engine Brake Force E

The engine brake force is applied rearwardly at the wheel center $O_1$ producing a rearward moment about the ball joint P. Since the longitudinal axes $A_1$ and $A_2$ of the rubber bushings $R_1$ and $R_2$ are inclined with respect to the wheel center plane B as previously described, the rubber bushing $R_1$ is deformed outwardly under this moment as shown by the arrow in FIG. 1c, whereas the rubber bushing $R_2$ is deformed inwardly. Thus, a toe-in movement is produced in the rear wheel 4.

(d) Behavior under a Driving Force K

The driving force K is applied forwardly to the rear wheel 4 at the wheel center $O_1$. Since the plane Q is offset inwardly from the wheel center plane at the level of the wheel center $O_1$, the force K produces a movement about the vertical axis L which tends to rotate the plane Q so that the forward portion thereof is moved inwardly. Thus, a toe-in movement is produced. In this instance, a trend of producing a toe-out movement may occur due to the inclinations of the longitudinal axes of the rubber bushing $R_1$ and $R_2$, however, since the rubber bushing $R_1$ has the stopper 41, the tendency is suppressed and overcome by the aforementioned trend of producing a toe-in movement. For a detailed discussion of the nomenclature associated with the orientation of plane Q see U.S. patent application Ser. No 489,492, now issued as U.S. Pat. No. 4,530,513 on July 23, 1985, which has already been incorporated by reference.

In an alternative arrangement, the plane Q may be located so that the imaginary intersection line q is offset transversely inwardly at the ground level. In this arrangement, a toe-in movement can be produced under either of the side force S, the engine brake force E and the engine driving force K in a similar way to that previously described. However, under a braking force B, the plane Q will be rotated outwardly about the ball joint P producing a toe-out movement in the wheel 4. However, this arrangement is very often satisfactory depending on the type of the vehicles.

In a further alternative arrangement wherein the plane Q is located so that the imaginary intersection line q is offset outwardly both at the level of the wheel center and the ground level, the rubber bushings $R_1$ and $R_2$ are arranged so that the longitudinal axis of the bushing $R_1$ is inclined in the opposite way to that shown in FIGS. 1c and 4. The longitudinal axis of the bushing $R_2$ is inclined in the same way as shown in FIGS. 1c and 4. Under these circumstances, the stopper 41 of the rubber bushing $R_1$ is located at the rear of rubber 40 so that a rearward deflection of the bushing is restricted. With this arrangement, it is possible to produce a toe-in movement under either of the side force S, the braking force B, the engine brake force E and the engine drive force K.

Figure 5:
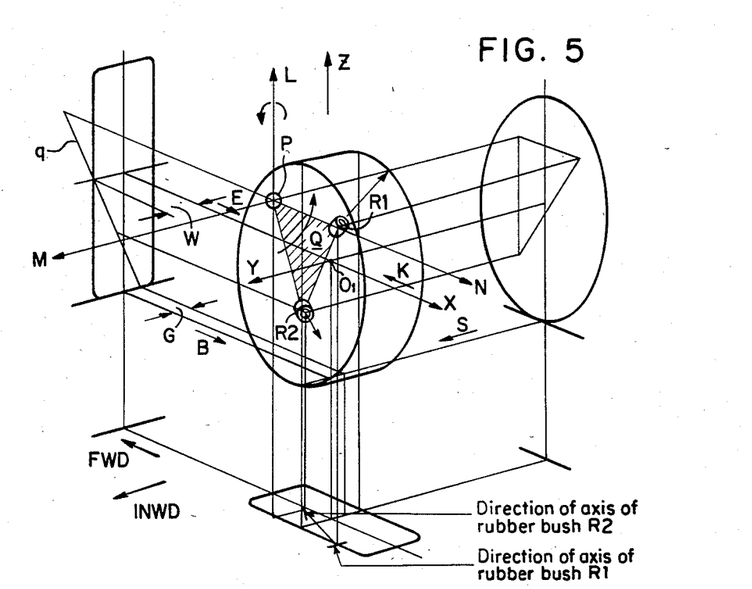
FIG. 5 is a diagrammatical illustration of another example of a connection between a suspension arm and a wheel hub.

FIG. 5 shows another example of the connection between the suspension arm and the wheel hub. In this example, the ball joint P is located forwardly of and above the wheel center $O_1$, that is, in the second quadrant II of the coordinate having the origin in the rotating axis ot the wheel. The rubber bushing $R_1$ is located rearwardly of and above the wheel center $O_1$ whereas the rubber bushing $R_2$ is forwardly of and below the wheel center $O_1$. The plane Q is located so that the intersection line q is offset as in FIG. 4. The rubber bushings $R_1$ and $R_2$ are arranged so that the axis of the bushing $R_1$ is inclined with respect to the wheel center plane rearwardly and outwardly and the axis of the bushings $R_2$ is inclined forwardly and outwardly. The rubber bushing $R_1$ is preferable of higher rigidity and the bushing $R_2$ is of lower rigidity. The relative differences in rigidity may be accomplished in any number of ways. Bushing $R_1$ may have a smaller diameter than bushing $R_2$. Also, bushing $R_1$ may be of greater width than bushing $R_2$. Combinations of differences in diameter and width are also contemplated. For a more detailed discussion of how the difference in the relative rigidity of the various bushings is accomplished, see copending U.S. patent application Ser. No. 489,492, previously incorporated by reference.

With this arrangement, the following displacements are produced in the rear wheel 4.

(a) Behavior under a Side Force S

The plane Q is rotated about the ball joint P producing a rotation about the axis N. At this instance, if the coefficient of elasticity of each bushing is so determined that the defelction at the bushing $R_2$ is greater than the bushing $R_1$, it is possible to produce a toe-in movement in the rear wheel 4.

(b) Behavior under a Braking Force B

The plane Q is rotated counter-clockwise about the L axis to produce a toe-in displacement.

(c) Behavior under an Engine Brake Force E

The plane Q is rotated forwardly about the balljoint P and toe-in displacement is produced due to the directions of the axes of bushings $R_1$ and $R_2$.

(d) Behavior under an Engine Drive Force K

The plane Q is rotated counter-clockwise about the L axis to produce toe-in displacement.

Figure 6:
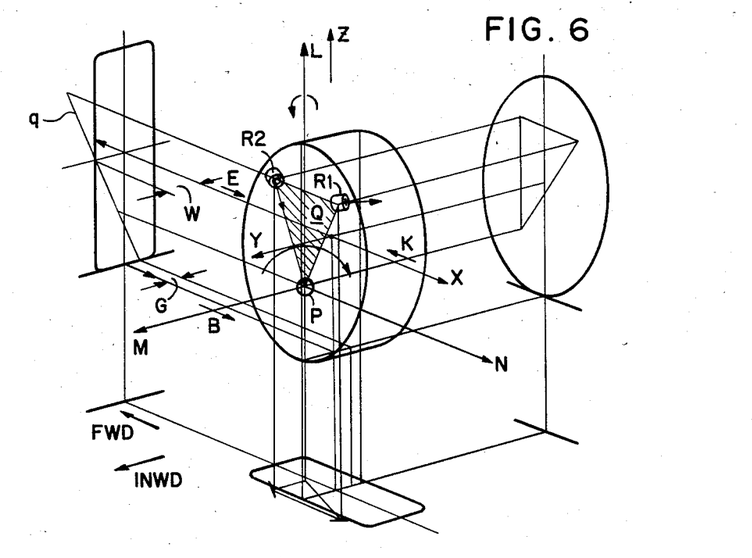
FIG. 6 is a diagrammatical illustration of another example of a connection between a suspension arm and a wheel hub.

FIG. 6 shows still another example of the connection between the suspension arm and the wheel hub. In this example, the ball joint P is located forwardly of and below the wheel center $O_1$, that is, in the third quadrant III of the coordinate system having the origin in the rotating axis of the wheel. The rubber bushing $R_1$ is located rearwardly of and above the wheel center $0_1$ whereas the rubber bushing $R_2$ is forwardly of and above the wheel center $O_1$. The plane Q is located so that the intersection line q is offset as in FIG. 4. The rubber bushings $R_1$ and $R_2$ are arranged so that the axis of the bushing $R_1$ is inclined with respect to the wheel center plane rearwardly and outwardly and the axis of the bushing $R_2$ is inclined forwardly and outwardly. Further, rubber bushing $R_1$ is arranged with stopper 41 located at the frong side of rubber 40 and rubber bushing $R_2$ is arranged with stopper 41 located at the frong side of rubber 47 so that the forward rotation of the wheel hub is prevented. See U.S. patent application Ser. No. 489,132, previously incorporated by reference, for further information concerning providing both of the bushings $R_1$ and $R_2$ with stoppers.

With this arrangement, the following displacements are produced in the rear wheel 4.

(a) Behavior under a Braking Force B

The plane Q is rotated counter-clockwise about the L axis to produce a toe-in displacement.

(b) Behavior under an Engine Brake Force E

The plane Q is rotated rearwardly about the ball joint P to produce a toe-in displacement due to the directions of the axes of the rubber bushings $R_1$ and $R_2$.

(c) Behavior under an Engine Drive Force K

The plane Q is rotated counter-clockwise about the L axis to produce a toe-in displacement.

Figure 7:
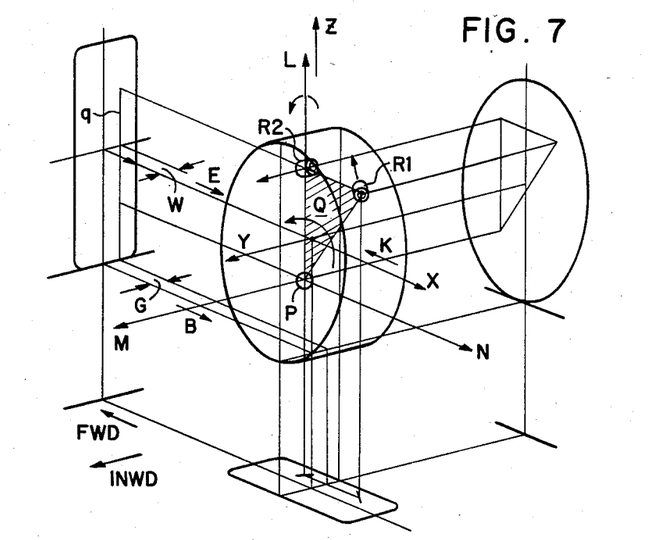
FIG. 7 illustrates a modification of the arrangement shown in FIG. 6.

Referring to FIG. 7, there is shown a modification of the arrangement shown in FIG. 6. In this example, the ball joint P is located forwardly of and below the wheel center $O_1$. Rubber bushings $R_1$ and $R_2$ are located in the same quadrants as FIG. 6, but are oriented differently. The axis of bushing $R_1$ is inclined with respect to the wheel center plane forwardly and outwardly and the axis of bushing $R_2$ is inclined forwardly and inwardly. Rubber bushing $R_1$ is arranged with stopper 41 located at the rear side and rubber bushing $R_2$ also is arranged with stopper 41 located at the rear side to prevent rearward displacement of the plane Q. With this structure, the behavior of the rear wheel is as follows.

(a) Behavior under a Braking Force B

The plane Q is rotated about the L axis to produce a toe-in displacement.

(b) Behavior under an Engine Brake Force E

The plane Q is rotated about the L axis counter-clockwise as seen from left to produce a toe-in displacement.

(c) Behavior under an Engine Drive Force K

The plane Q is rotated forward to produce a toe-in displacement due to the directions of the axes of rubber bushings $R_1$ and $R_2$.

Figure 8:
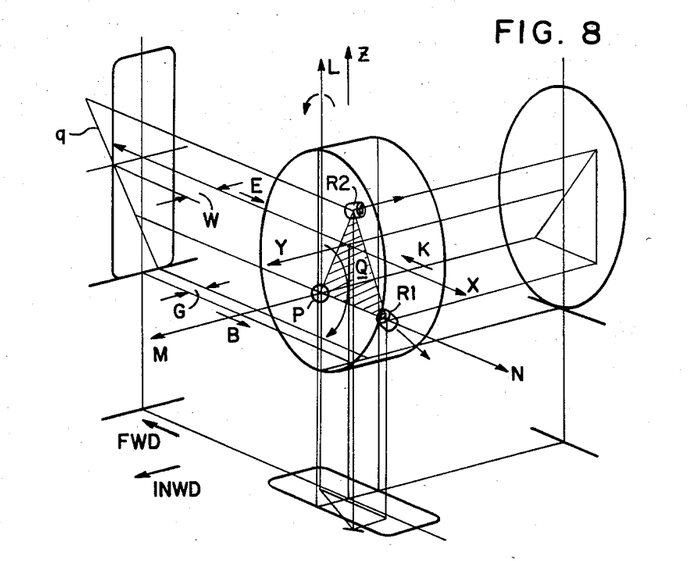
FIG. 8 is a diagrammatical illustration of another example of a connection between a suspension arm and a wheel hub.

FIG. 8 shows yet another example of the connection between the suspension arm and the wheel hub. In this example, the ball joint P is located forwardly of and below the wheel center $O_1$, that is, in the third quadrant III of the coordinate system having the origin in the rotating axis of the wheel. The rubber bushing $R_1$ is located rearwardly of and below the wheel center $O_1$ whereas the rubber bushing $R_2$ is rearwardly of and above the wheel center $O_1$. The plane Q is located so that the intersection line q is offset as in FIG. 4. The rubber bushings $R_1$ and $R_2$ are arranged so that the axis of the bushing $R_1$ is inclined with respect to the wheel center plane rearwardly and outwardly and the axis of the bushing $R_2$ is inclined rearwardly and outwardly. Further, both rubber bushings $R_1$ and $R_2$ are arranged with stopper 41 located on the forward side of rubber 40 and 47, respectively, to prevent forward rotation of plane Q.

With this arrangement, the following displacements are produced in the rear wheel 4.

(a) Behavior under a Braking Force B

The plane Q is rotated about the L axis to produce toe-in displacement.

(b) Behavior under an Engine Brake Force E

The plane Q is rotated rearwardly about the axis to produce a toe-in displacement due to the directions the axes of the rubber bushings $R_1$ and $R_2$.

(c) Behavior under an Engine Drive Force K

The plane Q is rotated counter-clockwise about the L axis to produce a toe-in displacement.

Figure 10:
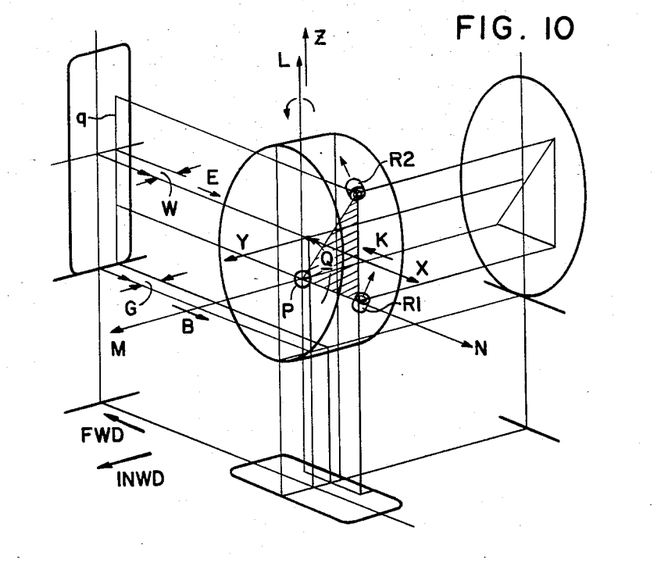
FIG. 10 is a modification of the arrangement shown in FIG. 8.

Referring to FIG. 10, there is shown a modification of the arrangement shown in FIG. 8. In this example, the ball joint P, the bushing $R_1$ and the bushing $R_2$ are located in the same quadrants as FIG. 8. The axis of bushing $R_1$ is inclined with respect to the wheel center plane forwardly and inwardly and the axis of bushing $R_2$ is inclined rearwardly and inwardly. Rubber bushings $R_1$ and $R_2$ are each arranged with stopper 41 located on the rearward side of rubber 40 and 47, respectively, to prevent rearward rotation of the plane Q. The plane Q is arranged so that the intersection line q is offset outwardly both at the level of the wheel center $O_1$ and at the ground level. With this structure, the behavior of the rear wheel is as follows.

(a) Behavior under a Braking Force B

The plane Q is rotated counter-clockwise about the L axis to produce a toe-in displacement.

(b) Behavior under an Engine Brake Force E

The plane Q is rotated about the L axis counter-clockwise as seen from the left to produce a toe-in displacement.

(c) Behavior under an Engine Drive Force K

The plane Q is rotated about the L axis to produce a toe-in displacement due to the directions of the axes of the rubber bushings $R_1$ and $R_2$.

Figure 11:
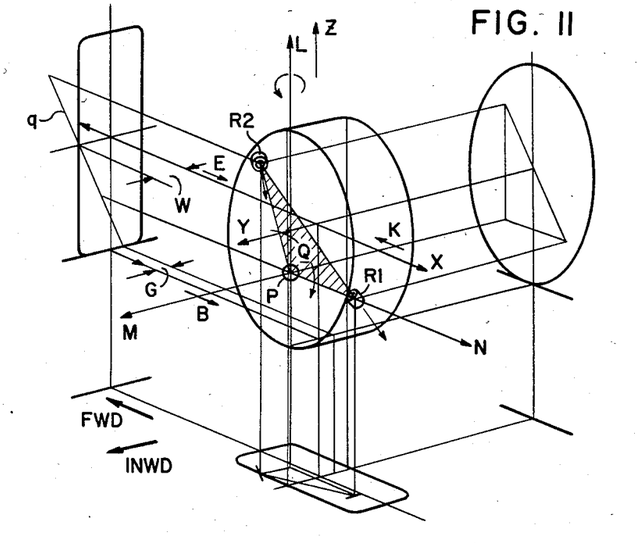
FIG. 11 is a diagrammatical illustration of another example of a connection between a suspension arm and wheel hub.

FIG. 11 shows another example of the connection between the suspension arm and the wheel hub. In this example, the ball joint P is located forwardly of and below the wheel center $O_1$, that is, in the third quadrant III of the coordinate system having the origin in the rotating axis of the wheel. The rubber bushing $R_1$ is located rearwardly of and below the wheel center $O_1$ whereas the rubber bushing $R_2$ is forwardly of and above the wheel center $O_1$. The plane Q is located so that the intersection line q is offset as in FIG. 4. The rubber bushings $R_1$ and $R_2$ are arranged so that the axis of the bushing $R_1$ is inclined with respect to the wheel center plane rearwardly and outwardly and the axis of the bushing $R_2$ is inclined forwardly and outwardly. Both rubber bushings $R_1$ and $R_2$ have stopper 41 located on the forward side of rubber 40 and 47, respectively, to prevent forward rotation of the plane Q.

With this arrangement, the following displacements are produced in the rear wheel 4.

(a) Behavior under a Braking Force B

The plane Q is rotated counter-clockwise about the L axis when viewed from the left to produce a toe-in displacement.

(b) Behavior under an Engine Brake Force E

The plane Q is rotated counter-clockwise about the L axis to produce a toe-in displacement.

(c) Behavior under an Engine Drive Force K

The plane Q is rotated rearward about the M axis to produce a toe-in displacement due to the directions of the axes of the bushings $R_1$ and $R_2$.

Figure 9:
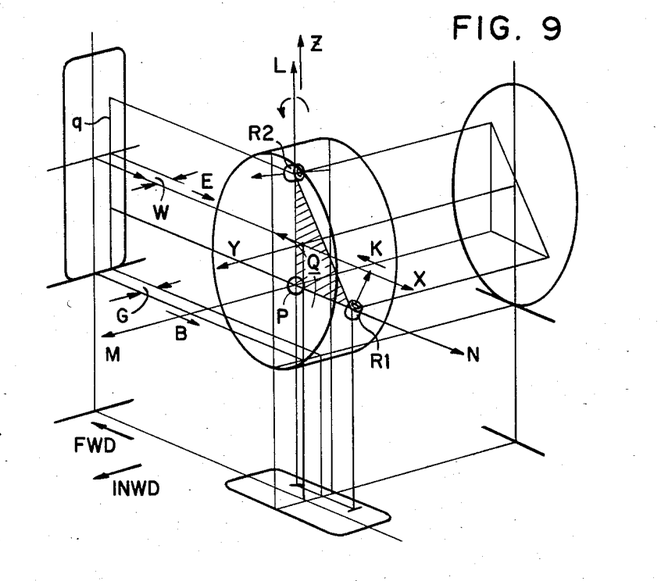
FIG. 9 is a modification of the arrangement shown in FIG. 11.

Referring to FIG. 9, there is shown a modification of the arrangement shown in FIG. 11. In this example, the ball joint P, the bushing $R_1$ and the bushing $R_2$ are located in the same quadrants as FIG. 11. The axis of bushing $R_1$ is inclined with respect to the wheel center plane forwardly and inwardly and the axis of bushing $R_2$ is inclined forwardly and inwardly. Rubber bushings $R_1$ and $R_2$ are each arranged with stopper 41 located on the rearward side of rubber 40 and 47, respectively, to prevent rearward rotation of the plane Q. The plane Q is arranged so that the intersection line q is offset inwardly outwardly both at the level of the wheel center $O_1$ and at the ground level.

With this arrangement, the following displacements are produced in the rear wheel 4.

(a) Behavior under a Braking Force B

The plane Q is rotated about the L axis to produce a toe-in displacement.

(b) Behavior under an Engine Brake Force E

The plane Q is rotated about the L axis to produce a toe-in displacement.

(c) Behavior under an Engine Drive Force K

The plane Q is rotated forward to produce a toe-in displacement due to the directions of the axes of the rubber bushings $R_1$ and $R_2$.

Figure 12:
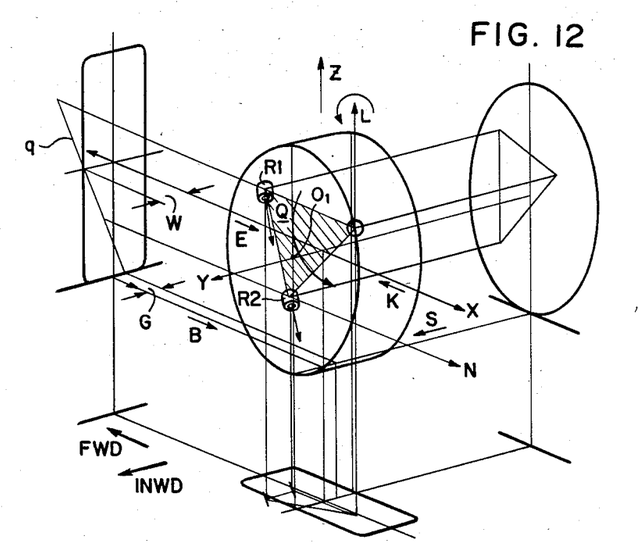
FIG. 12 is a diagrammatical illustration of another example of a connection between a suspension arm and a wheel hub.

FIG. 12 shows yet a further example of the connection between the suspension arm and the wheel hub. In this example, the ball joint P is located rearwardly of and above the wheel center $O_1$, that is, in the first quadrant I of the coordinate having the origin in the rotating axis of the wheel. The rubber bushing $R_1$ is located forwardly of and above the wheel center $O_1$ whereas the rubber bushing $R_2$ is forwardly of and below the wheel center $O_1$. The plane Q is located so that the intersection line q is offset as in FIG. 4. The rubber bushings $R_1$ and $R_2$ are arranged so that the axis of the bushing $R_1$ is inclined with respect to the wheel center plane forwardly and outwardly and the axis of the bushing $R_2$ is also inclined forwardly and outwardly.

With this arrangement, the following displacements are produced in the rear wheel 4.

(a) Behavior under a Side Force S

The plane Q is rotated about the ball joint P producing a rotation about the L axis to produce a toe-in displacement.

(b) Behavior under a Braking Force B

The plane Q is rotated about the L axis to produce a toe-in displacement.

(c) Behavior under an Engine Brake Force E

The plane Q is rotated forwardly about the axis M to produce a toe-in displacement due to the directions of the axes of the rubber bushings $R_1$ and $R_2$.

(d) Behavior under an Engine Drive Force K

The plane Q is rotated about the axis L to produce a toe-in displacement.

Figure 2:
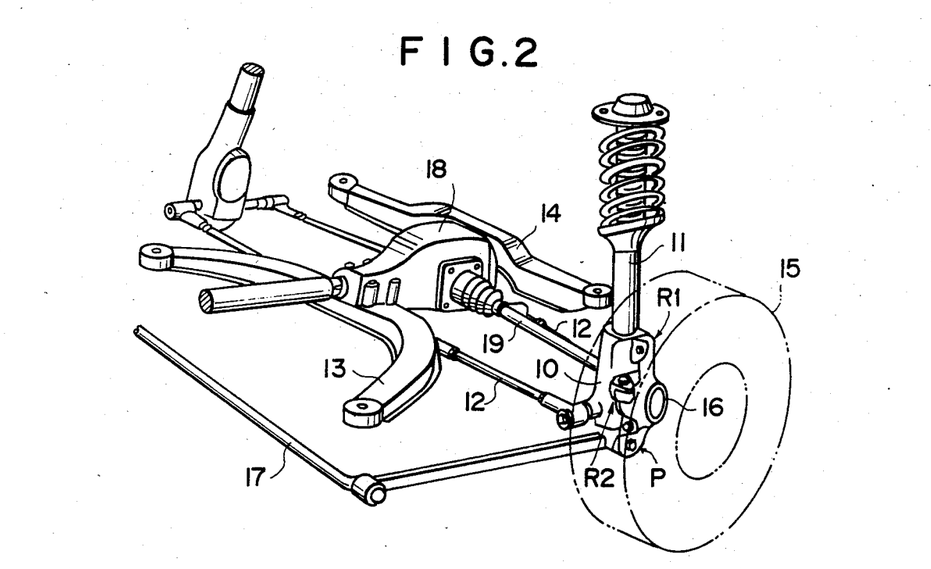
FIG. 2 is a fragmentary perspective view of a rear suspension mechanism similar to FIG. 1a but showing another example.

Referring to FIG. 2, there is shown another example of a vehicle rear suspension which includes a strut hub 10 to which a suspension strut assembly 11 is secured at its lower end. The strut hub 10 is connected through a pair of transverse links 12 with sub-frames 13 and 14 of a vehicle body which also carry a differential gear box 18. A stabilizer 17 may be provided as well known in the art. A wheel hub 16 carries a rear wheel 15 for rotation about a rotating axis. In this type of suspension mechanism, the wheel hub 16 is connected with the strut hub 10 through a ball joint P and a pair of rubber bushings $R_1$ and $R_2$ which are arranged in any one of the manners described previously. A drive axle 19 extends from the differential gear box 18 to drive the wheel 15.

Figure 3:
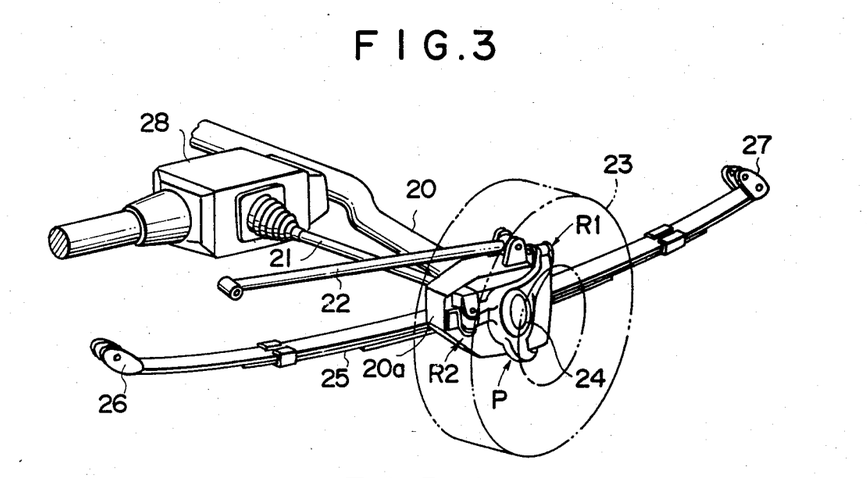
FIG. 3 is a fragmentary perspective view showing a further example.

FIG. 3 shows a further example of a vehicle rear suspension mechanism which includes a transversely extending pipe 20 having a wheel support bracket 20a at each end. The bracket 20a is suspended by a left spring assembly 25 which are attached to the vehicle body (not shown) through fittings 26 and 27. A differential gear box 28 is provided and has a drive axle 21 to drive a rear wheel 23. The bracket 20a is also connected through a tension rod 22 with the vehicle body. The rear wheel 23 is rotatably carried by a wheel hub 24 which is connected with the bracket 20a through a ball joint P and a pair of rubber bushings $R_1$ and $R_2$ arranged in any of the manners described previously.

The invention has thus been shown and described with reference to specific embodiments; however, it should be noted that the invention is in no way limited to the details of the illustrated arrangements but chanegs and modifications may be made without departing from the scope of the appended claims.

We claim:

1. A vehicle rear suspension mechanism comprising: a suspension member connected with a vehicle body; wheel hub means supporting a rear wheel having a wheel center plane for rotation about a rotating axis; and connecting means for connecting said wheel hub means with said suspension member, said connecting means including ball joint means having a pivot center located forwardly of and below the rotating axis of the rear wheel and connecting said wheel hub means to said suspension member pivotably about the pivot center, first resilient means located between said wheel hub means and said suspension member rearwardly of and above the rotating axis of the rear wheel, and second resilient means located between said wheel hub means and said suspension member forwardly of and above the rotating axis of the rear wheel.

2. The suspension mechanism of claim 1 wherein a plane defined by the pivot center of the ball joint means and centers of said first and second resilient means has an intersection with a vertical plane containing said rotating axis to define an intersection line which is offset at ground level transversely outwardly of said wheel center plane.

3. The suspension mechanism of claim 2 wherein said intersection line is offset transversely inwardly at the level of the rotating axis.

4. The suspension mechanism of claim 3, wherein each of said first and second resilient means includes stopper means for preventing forward rotation of said wheel hub.

5. The suspension mechanism of claim 2 wherein said intersection line is offset transversely outwardly at the level of the rotating axis.

6. A vehicle rear suspension mechanism comprising:
a suspension member connected with a vehicle body;
wheel hub means supporting a rear wheel having a wheel center plane for rotation about a rotating axis; and
connecting means for connecting said wheel hub means with said suspension member, said connecting means including ball joint means having a pivot center located forwardly of and below the rotating axis of the rear wheel and connecting said wheel hub means to said suspension member pivotably about said pivot center, first resilient means located between said wheel hub means and said suspension member rearwardly of and below the rotating axis of the rear wheel, and second resilient means located between said wheel hub means and said suspension member forwardly of and above the rotating axis of the rear wheel.

7. The suspension mechanism of claim 6 wherein a plane defined by the pivot center of the ball joint means and centers of said first and second resilient means has an intersection with a vertical plane containing said rotating axis to define an intersection line which is offset at ground level transversely outwardly of said wheel center plane.

8. The suspension mechanism of claim 7, wherein said intersection line is offset transversely inwardly at the level of the rotating axis.

9. The suspension mechanism of claim 7, wherein said intersection line is offset transversely outwardly at the level of said rotating axis.

10. The suspension mechanism of claim 9, wherein each of said first and second resilient means includes stopper means for preventing rearward rotation of said wheel hub.

11. A vehicle rear suspension mechanism comprising:
a suspension member connected with a vehicle body;
wheel hub means supporting a rear wheel having a wheel center plane for rotation about a rotating axis; and
connecting means for connecting said wheel hub means with said suspension member, said connecting means including ball joint means having a pivot center located forwardly of and below the rotating axis of the rear wheel and connecting said wheel hub to said suspension member pivotably about the pivot center, first resilient means located between said wheel hub mans and said suspension member rearwardly of and below the rotating axis of the rear wheel, and second resilient means located between said wheel hub means and said suspension member rearwardly of and above the rotating axis of the rear wheel.

12. The suspension mechanism of claim 11, wherein a plane defined by the pivot center of the ball joint means and centers of said first and second resilient means has a intersection with a vertical plane containing said rotating axis to define an intersection line which is offset at ground level transversely outwardly of said wheel center plane.

13. The suspension mechanism of claim 12, wherein said intersection line is offset transversely inwardly at the level of said rotating axis.

14. The suspension mechanism of claim 13, wherein each of said first and second resilient means includes stopper means for preventing forward rotation of said wheel hub.

15. The suspension mechanism of claim 12, wherein said intersection line is offset transversely outwardly of the level of said rotating axis.

16. A vehicle rear suspension mechanism comprising:
a suspension member connected with a vehicle body;
wheel hub means supporting a rear wheel having a wheel center plane for rotation about a rotating axis; and
connecting means for connecting said wheel hub means with said suspension member, said connecting means including ball joint means having a pivot center located forwardly of and above the rotating axis of the rear wheel and connecting said wheel hub means to said suspension member pivotably about the pivot center, first resilient means located between said wheel hub means and said suspension member rearwardly of and above the rotating axis of the rear wheel, and second resilient means located between said wheel hub means and said suspension member forwardly of and below the rotating axis of the rear wheel.

17. The suspension mechanism of claim 16, wherein said first resilient means is more rigid than said second resilient means.

18. The suspension mechanism of claim 16, wherein a plane defined by the pivot center of the ball joint means and centers of said first and second resilient means has an intersection with a vertical plane containing said rotating axis to define an intersection line which is offset at ground level transversely outwardly of said wheel center plane.

19. The suspension mechanism of claim 1, wherein said intersection line is offset transversely inwardly at the level of the rotating axis.

20. A vehicle rear suspension mechanism comprising:
a suspension member connected with a vehicle body;
wheel hub means supporting a rear wheel having a wheel center plane for rotation about a rotating axis; and
connecting means for connecting said wheel hub means with said suspension member, said connecting means including ball joint means having a pivot center located rearwardly of and above the rotating axis of the rear wheel and connecting said wheel hub means to said suspension member pivotably about the pivot center, first resilient means located between said wheel hub means and said suspension member forwardly of and above the rotating axis of the rear wheel, and second resilient means located between said wheel hub means and said suspension member forwardly of and below the rotating axis of the rear wheel.

21. The suspension mechanism of claim 20, wherein a plane defined by the pivot center of the ball joint means and centers of said first and second resilient means has an intersection with a vertical plane containing said rotating axis to define an intersection line which is offset at ground level transversely outwardly of said wheel center plane.

22. The suspension mechanism of claim 21, wherein said intersection line is offset transversely inwardly at the level of the rotating axis.

23. The suspension mechanism of claim 22, wherein each of said first and second resilient means includes stopper means for preventing rearward rotation of said wheel hub.

* * * * *